United States Patent [19]
deCarmo

[11] Patent Number: 6,081,855
[45] Date of Patent: Jun. 27, 2000

[54] DIGITAL VERSATILE DISC PLAYBACK SYSTEM WITH FLEXIBLE INPUT INTERFACE

[75] Inventor: Linden A. deCarmo, Plantation, Fla.

[73] Assignee: Oak Technology, Inc., Sunnyvale, Calif.

[21] Appl. No.: 09/060,481

[22] Filed: Apr. 15, 1998

[51] Int. Cl.$^7$ .................................................. G06F 13/00
[52] U.S. Cl. ................................ 710/62; 710/73; 710/72; 710/63; 710/64; 710/65
[58] Field of Search ................................ 360/133; 710/1, 710/73, 72, 62, 63, 64, 65; 340/636

[56] References Cited

U.S. PATENT DOCUMENTS

| | | | |
|---|---|---|---|
| 4,866,638 | 9/1989 | Cosentino et al. | 364/521 |
| 5,261,079 | 11/1993 | Celi, Jr. | 395/500 |
| 5,347,632 | 9/1994 | Fileep et al. | 395/200 |
| 5,428,730 | 6/1995 | Baker et al. | 395/154 |
| 5,502,839 | 3/1996 | Kolnick | 395/800 |
| 5,548,779 | 8/1996 | Andert et al. | 395/823 |
| 5,740,801 | 4/1998 | Branson | 128/653.1 |
| 5,752,050 | 5/1998 | Hernandez et al. | 395/750.07 |
| 5,764,861 | 6/1998 | Priem et al. | 395/678 |
| 5,815,682 | 9/1998 | Williams et al. | 395/500 |
| 5,948,084 | 9/1999 | Ha | 710/73 |
| 5,959,536 | 9/1999 | Chambers et al. | 340/636 |

*Primary Examiner*—Thomas C. Lee
*Assistant Examiner*—Katharina Schuster
*Attorney, Agent, or Firm*—Kudirka & Jobse, LLP

[57] ABSTRACT

A media player includes an input manager and an input driver. The input manager operates between a device driver and a player application program. The input manager provides a uniform interface for input drivers and, upon receiving a command from an input driver passes the command along to an application program. The input manager ranks input devices according to a user's preferences and, should the input manager receive commands from more than one device driver at one time, the input manager passes along the commands in accordance with the user's input device preferences. Each input device driver provides the input manager with an indication of the driver's capabilities so that the input manager passes the appropriate information, such as location information in the case of a location sensitive input device's driver, to the driver. Each input device driver also performs the translation of input signals into a format that is acceptable by the input manager.

17 Claims, 8 Drawing Sheets

DIGITAL VERSATILE DISC PLAYBACK SYSTEM WITH FLEXIBLE INPUT INTERFACE

FIELD OF THE INVENTION

This invention relates generally to improvements in digital versatile disc (DVD) systems and, more particularly, to an improved system for accepting user input to a DVD system.

BACKGROUND OF THE INVENTION

Digital versatile discs (DVDs) are information storage devices used for storing data such as audio, video, and computer software. The storage and playback mechanism used in DVDs closely resembles the mechanism used in compact discs (CDs) and DVD players use the same laser technology as CD players. Briefly, both DVDs and CDs store information as a pattern of pits formed in a metallic substrate. The pit patterns form digital words and can be read by shining a laser beam on the disc surface and detecting the reflected beam. However, the information storage capacity of a typical DVD is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. DVDs, however, can store information in several formats. For example, DVDs which are used to store video information, hereinafter called DVD-VIDEO discs, may use various known information compression algorithms, such as MPEG-2 for video compression/decompression. A DVD may also include high fidelity sound data, for example, in uncompressed linear pulse code modulated data streams which have sample rates between 48–90 kHertz and are sampled at 16 or 24 bits. Still other DVD versions, hereinafter called DVD-ROM discs, can store digital data for computer use, and the data may also be compressed on these discs.

Conventionally, a DVD player accepts a user's input through an input device such as a dedicated infrared (IR) remote control device. The remote control device typically responds to a user's activation of a button by translating button information, e.g. row and column information, into a series of infrared light pulses. The light pulses are keyed on and off at a base rate of 30 to 40 KHz in order to distinguish the control signal from ambient light. The train of light pulses are generally formatted to include a header, which identifies a target device, and command information. The DVD player receives the light pulses and converts them into a binary electronic representation corresponding to the button that had been depressed by the user. For example, assume that a DVD player's dedicated remote control device includes a rectangular array of buttons, with the button in the upper left corner of the array being an "on/off" button. Assume further that the remote control device emits a series of light pulses corresponding to a binary value of "00" in response to the depression of this button. When it receives the "00" series of light pulses from the remote control device, the DVD player, which continuously supplies power to a "monitoring circuit" even when the player is "off", recognizes, through means of an application program included within the DVD player, that the "00" sent by the remote control devices is a "power" command and the DVD player responds accordingly.

Although a dedicated remote control system such as just described may work reasonably well, there are a number of input devices which a user may prefer for any of a variety of reasons. Another IR remote control device may, for example, be more aesthetically appealing, or it may provide a more comfortable layout, or it may provide additional features, such as an anti-loss feature, which makes it more appealing to a user. Other input systems, such as a speech input system, a trackball, or mouse, may also be preferred by a particular user. Unfortunately, a typical dedicated remote control DVD player system cannot accommodate a variety of input devices. Even another IR remote control device with the same basic physical button layout may not be compatible, because the button definitions may vary. For example, the button in the upper left corner may be defined as a "reverse" button, rather than a power button and the DVD player's application program would misinterpret the transmitted button information. Alternatively, the same button location may have the same definition, but the pulse code produced may be different, so that, for example, a "power" button in the upper left corner of one remote control device produces a "00" output and the "power" button in the upper left corner of another remote control device produces a "01". Although it is conceivable that the DVD player's application program could be re-written to accommodate additional input devices, this would require a substantial effort each time a new input device is added to the DVD player's repertoire.

With all the variety of button arrangements and definitions, the variety of input mechanisms, such as speech, infrared, etc, and the continuous development of new input devices, accommodating a variety of input devices and accommodating new input devices as they are developed becomes a substantial challenge. Given the availability of a wide variety of input devices and the continuous development of new input devices, it would be highly desirable to provide a DVD player system which accommodates a variety of input devices and is capable of accommodating new input devices without requiring that its entire application program be rewritten. Additionally, it would be highly desirable for a DVD player to provide arbitration among multiple input devices to thereby reduce confusion associated with the simultaneous activation of more than one input device.

SUMMARY OF THE INVENTION

The foregoing need is satisfied in one embodiment of the present invention in which a media player includes an input manager and an input driver.

In the illustrative embodiment of the new media player, a DVD player includes an input manager which operates "between" a DVD device driver and a DVD player application program. The input manager receives commands from one or more input device drivers and selects one or more of the commands to pass along to an application program. In addition to other features, the input manager provides a standard interface for input device drivers so that, not only can a given DVD system accept input from a variety of input devices, a given input device may be used with a variety of DVD systems which include the input manager. Additionally, in the illustrative embodiment the input manager determines which of a plurality of input devices a particular user prefers to use and stores that preference information. This device preference information may be stored, for example, in a user identification file. The input manager employs this device preference information to determine the manner in which simultaneously received commands from different input devices are passed along to the application program.

Each input device driver of the illustrative embodiment provides the input manager with an indication of the input device driver's capabilities. This may take the form of informing the input manager that the input device driver supports three-dimensional buttons, for example, so that information related to three dimensional buttons will be passed to that driver. Similarly, a location-sensitive input device, such as a mouse or other pointing device, will indicate this sensitivity to the input manager so that the input manager will pass along location information, e.g., the location upon a display of a user preference button, to the location-sensitive device's driver, but will not pass it along to a non-location sensitive device's driver, such as an IR remote device's driver. Each input device driver also performs the "translation" of input signals into a format that is acceptable by the input manager. That is, whatever form the input signal may take, whether it is a series of IR pulses, a speech signal, or movement signals from a mouse, the device driver converts these signals into commands, such as "play", "pause", etc.

In the illustrative embodiment, the input manager converts commands received from a driver into commands which conform to the dictates of an particular application program. This translation may be a direct "pass through", should the particular driver support the same command set as the DVD application program. Alternatively, the DVD input manager may "convert" a driver's command, a command which is a superset of the commands supported by a given application program, into a command, or a series of commands, which are acceptable to the application program. The input manager loads all drivers installed in a DVD player, ranks a particular user's input device preferences, and passes commands from a DVD driver to a DVD application program. Should the input manager receive simultaneous commands from different drivers, the input manager takes into account the user preferences and the requested commands before passing a command to an application program. Consideration given to device preferences may result in only one of the simultaneously received commands being passed to the application program, both of the commands being passed sequentially in either direct or inverse relation to the preference ranking of the sending device, or in neither command being passed along to the application program. In an illustrative embodiment, a client identification file may be employed to store individual users' device preferences. Although particularly suited to application in DVD players, the inventive concepts are applicable to other media players, such as digital broadcast system players.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
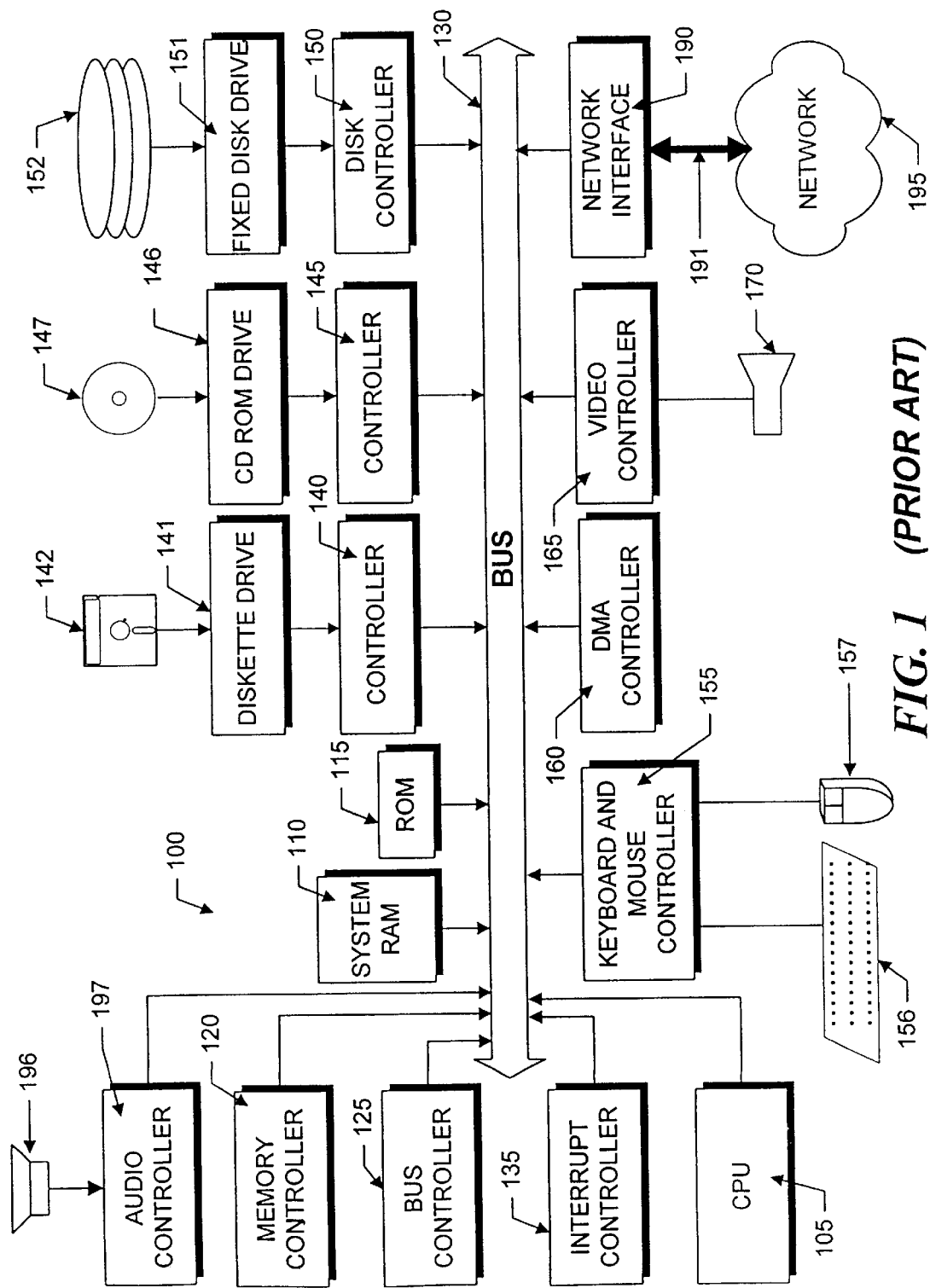
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as an IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of the computer system 100 is generally controlled and coordinated by operating system software, such as the OS/2® operating system, available from International Business Machines Corporation, Boca Raton, Fla. The operating system controls the allocation of system resources and performs tasks such as processing, scheduling, memory management, networking, and I/O services, among other things. In particular, an operating system resident in system memory and running on CPU 105 coordinates the operation of the other elements of computer system 100. The present invention may be implemented with any of a number of commercially available operating systems, including OS/2, UNIX, and DOS, etc. One or more applications, such as Lotus Notes, commercially available from Lotus Development Corp., Cambridge, Mass., may execute on the computer system 100. If operating system 200 is a true multi-tasking operating system, such as OS/2, multiple applications may execute simultaneously.

Figure 2:
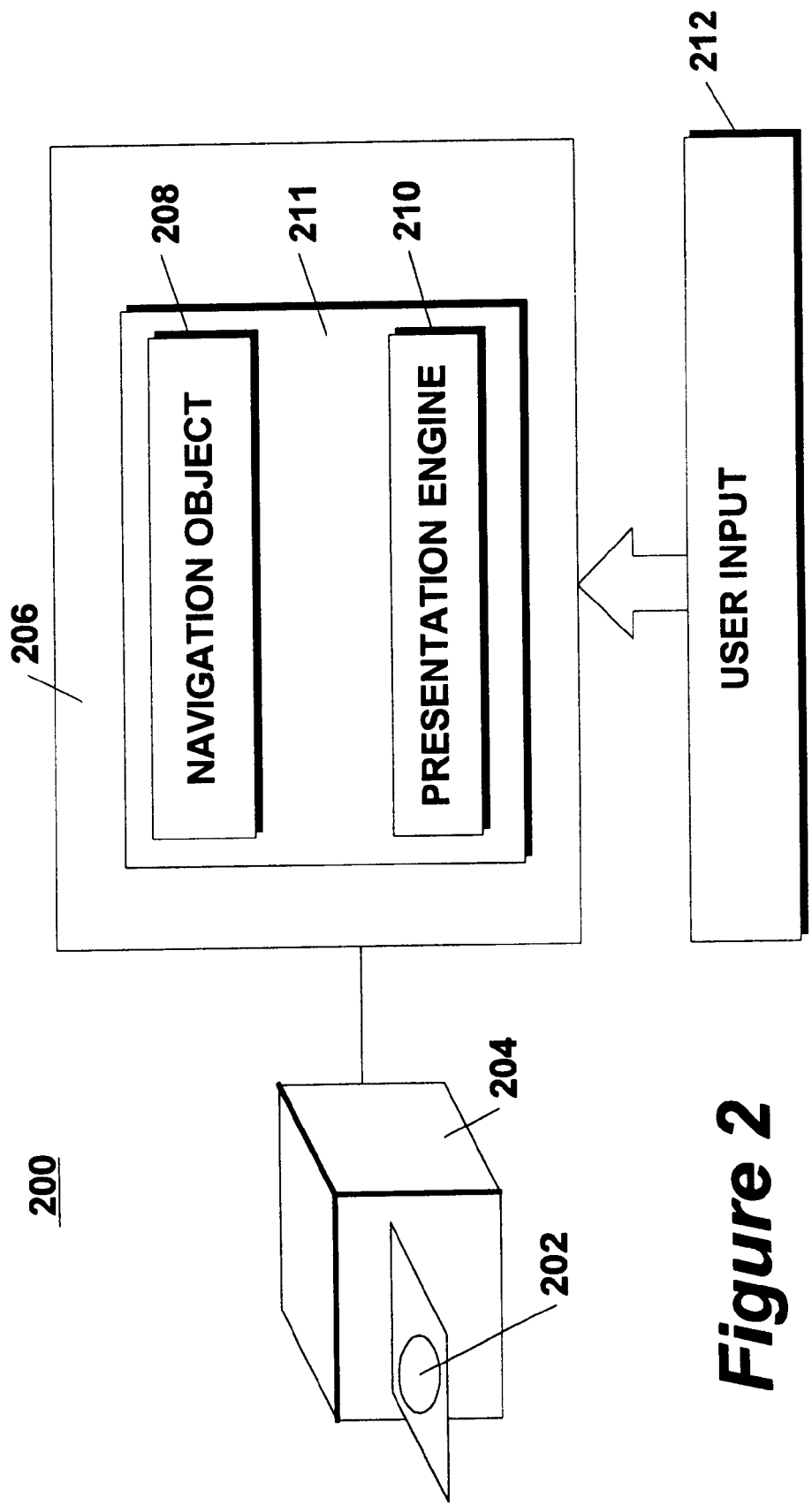
FIG. 2 is a conceptual diagram of the elements comprising a DVD system including a DVD drive and an accompanying computer with software components installed therein.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD systems, such as a DVD-VIDEO systems, may be used with many other types of multimedia devices, including television systems. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for Read-Only Disc Vol. 3 and disc 202 preferably contains up to seventeen gigabytes of information. The computer 206 includes a driver (not shown) for enabling the operating system in the computer 206 to control and exchange information with the drive 204. It also includes one or more input devices 212 which receive input from a user.

The computer 206 also includes an application program 211 that, in turn, includes control and playback program shown schematically in FIG. 2 as having a navigation object 208 with logic for reading data from the drive. A presentation engine 210 includes decompressing and decoding routines for decoding the information from the disc 202 and routines for formatting the information for display. For example, the audio information may be compressed by means of conventional compression technique known as Dolby® AC-3® compression (also known as "Dolby® Digital" decompression), and video information may be compressed using a compression technique known as MPEG-2 (Moving Picture Experts Group-2).

In an illustrative embodiment, the software elements of system 200 are implemented using object-oriented programming techniques. As will be understood by those skilled in the art, Object-Oriented Programming (OOP) techniques involve the definition, creation, use and destruction of "objects".

Figure 3:
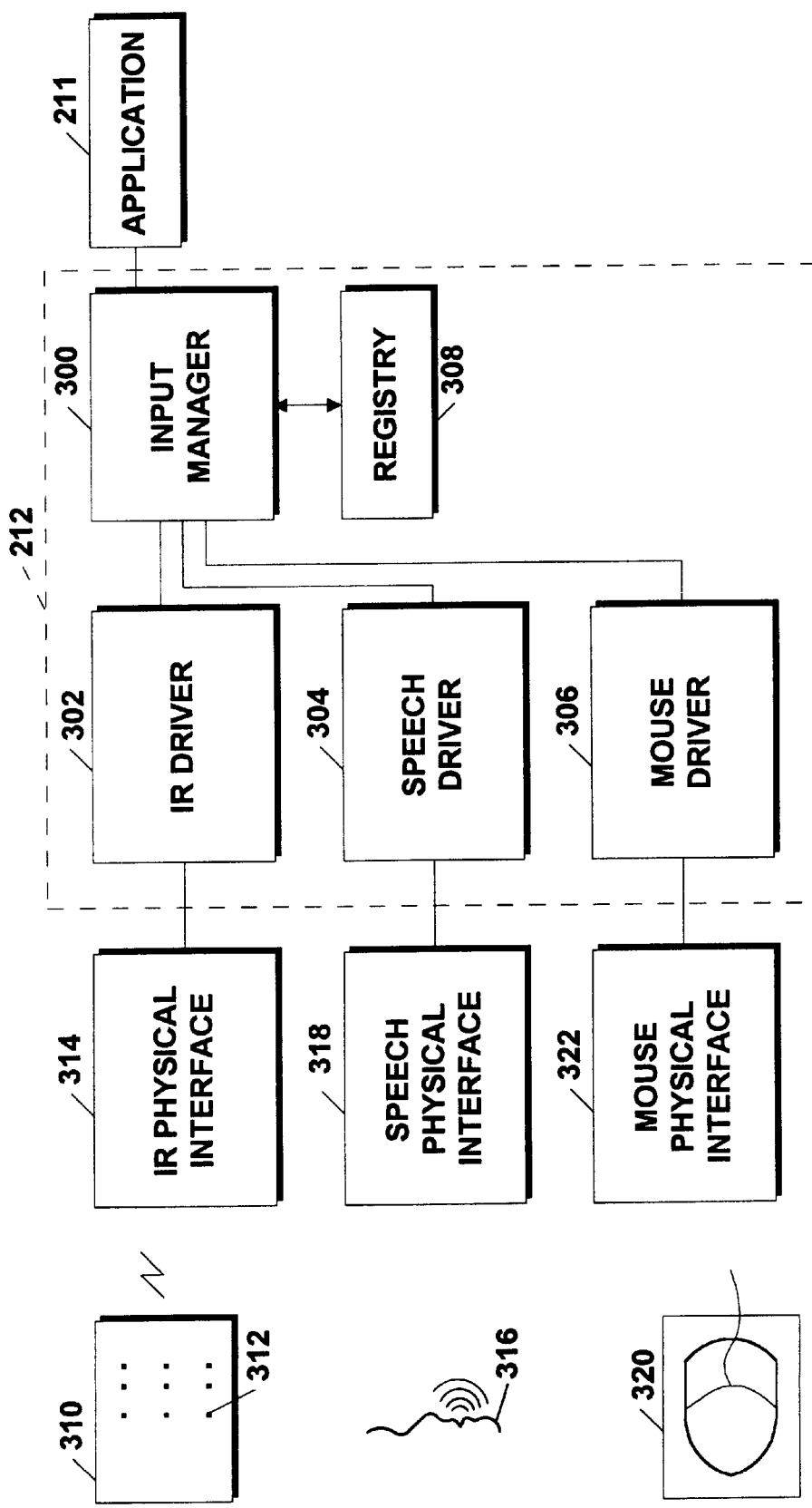
FIG. 3 is a conceptual block diagram of the DVD system of FIG. 2 which illustrates components of the system in greater detail.

In the illustrative embodiment of FIG. 3, a DVD player interface 212 includes an input manager 300 which operates "between" a DVD device driver and a DVD player application program 211. The input manager receives commands from one or more input device drivers, such as IR driver 302, speech driver 304, or mouse driver 306 and selects one or more of the commands to pass along to an application program 211. Additionally, in the illustrative embodiment, the input manager 300 determines which of a plurality of input devices a particular user prefers to use and stores that preference information in a registry, or database, 308 which employs some type of nonvolatile storage such as disk 152, an electrically erasable programmable read only memory (EEPROM), or battery-backed RAM, to retain the preference information from one user session to another. The input manager 300 employs this device preference information to determine the sequence in which simultaneously received commands from different input devices are passed along to the application program 211.

A DVD user may employ a device such as an IR remote control device 310 to transmit a series of infrared pulses that contain information related to a specific button that a user activates out of the array of buttons 312 positioned on the device 310. The IR signal is received by an IR physical interface 314 which typically includes a photodiode and IR control circuitry which translates the series of infrared pulses into an electrical signal which identifies the button on the IR device 310 which has been activated. This information is passed along to the IR driver 302 which maps the device button activation information into one of the commands supported the IR device 310. To alert the input manager, the IR driver 302 sets a semaphore in an event queue which is examined by the input manager 300. The input manager 300 responds to activation of the semaphore by passing the command along to the application program 211 and interpreting the command to conform with the commands supported by the application program, then passing the interpreted command along to the application program 211. However, the input manager 300 may block the command if it is not supported by the application program 211. The input manager also, as discussed in greater detail in the discussion related to FIGS. 7A and 7B, arbitrates among commands that are simultaneously received from a number of input devices.

Similarly, speech input from a user 316 may be received by a speech physical interface 318, which may comprise a transducer 196 and an audio controller 197 of FIG. 1. The speech interface 318 converts the speech input signal into electronic signals which are employed by the speech input driver 304, in a manner similar to the IR driver, to produce user commands that are passed along to the Input manager 300. The input manager passes commands from the speech driver 304 to the application program 211.

A mouse 320 and mouse physical interface, which may take the form of the mouse 157 and mouse controller 155 of FIG. 1, may also be employed to accept user input. A mouse driver interprets signals related to movements of the mouse 157 into user commands and passes these along to the input manager 300. Additional user input devices may also be employed.

Each input device driver of the illustrative embodiment, e.g., IR driver 302, speech driver 304, and mouse driver 306, provides the input manager 300 with an indication of the driver's capabilities, such as the commands supported by the driver. The commands may include a subset, all of, or a superset of the commands set forth in the DVD specification for Read Only Disc 1.0 Vol. 3, available from Toshiba Corporation, 1-1Shibaura 1-Chome, Minato-ku, Tokyo 105-01 JAPAN. As will be discussed in greater detail in relation to FIG. 4, the input manager 300 stores the drivers' information, in addition to other information, in the non-volatile memory of the registry 308. The input manager also monitors a user's input to rank the user's device preferences. This ranking may take the form of a simple counter mechanism whereby each time a user employs a specific device, an associated counter is incremented. When input from any of the devices is received, the device's ranking, stored in the registry 308, is examined and, if a command is received from another device at the same time, the input manager passes along the command from the higher-ranking device to the application 211.

In the illustrative embodiment, the input manager 300, in addition to providing "traffic flow" for commands received from the various drivers, determines which one of conflicting commands is passed along to the application 211. For example, should a user, by frequent use, indicate his preference for voice input, the input manager will store this preference within the registry 308. When commands are received simultaneously from voice input 316 and IR remote 310, the speech input command will be given higher priority by the input manager 300. The higher ranking afforded by the input manager 300 may have only a minor impact. For example, a "title play" command from the higher ranking voice input to the application 211 may be passed before a "chapter play" command from the mouse involving the same title. However, the input manager 300 may also suppress conflicting simultaneous commands from lower-ranked input devices. For example, should a "NextChapter" command be received from a higher ranking voice input 316 at the same time as a "PreviousChapter" command from a lower ranking mouse 320, the input manager 300 may pass the "NextChapter" command to the application 211 and suppress the "PreviousChapter" command from the mouse.

Figure 4:
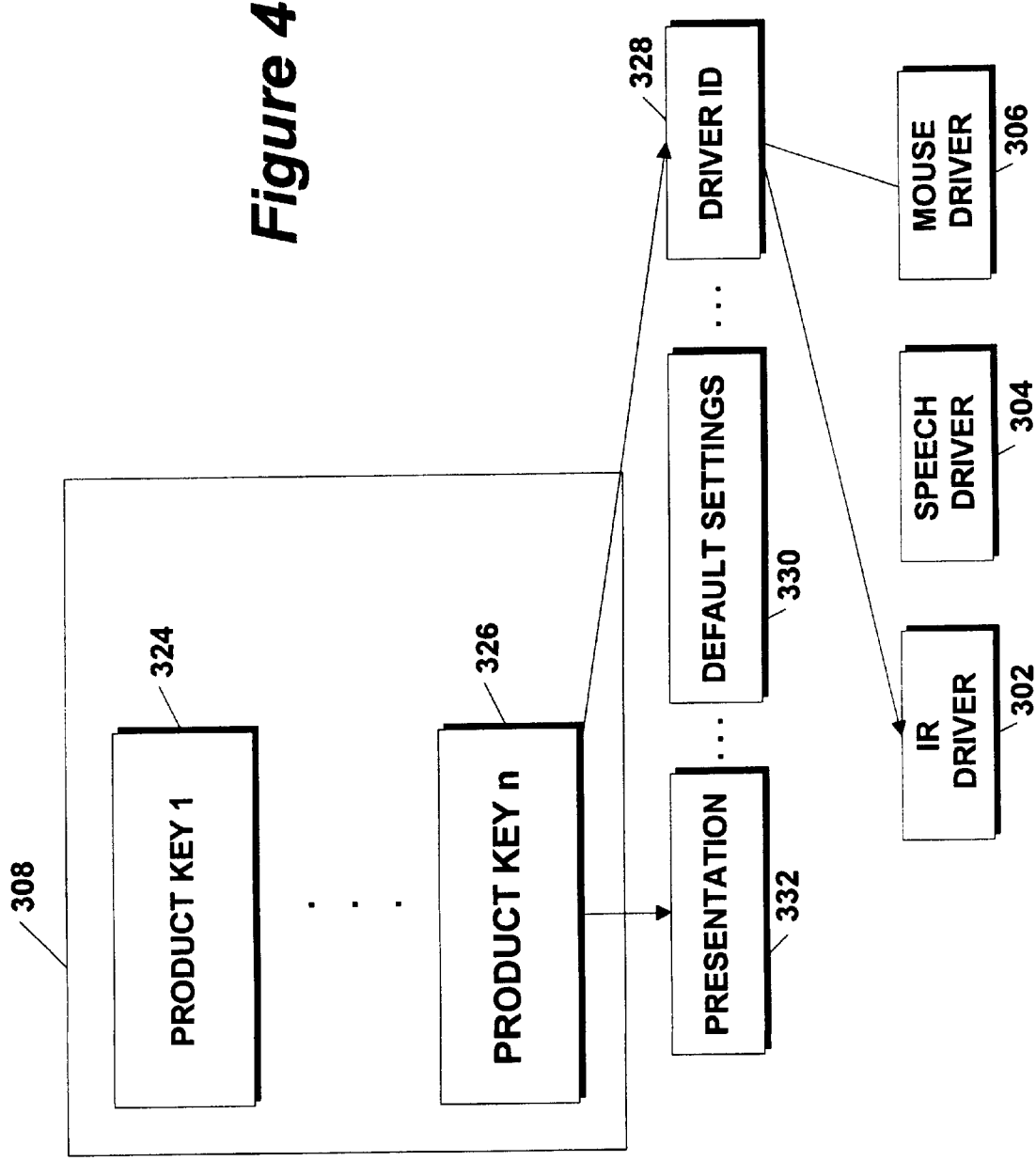
FIG. 4 is a block diagram illustrating the DVD system product key registry.
Figure 5:
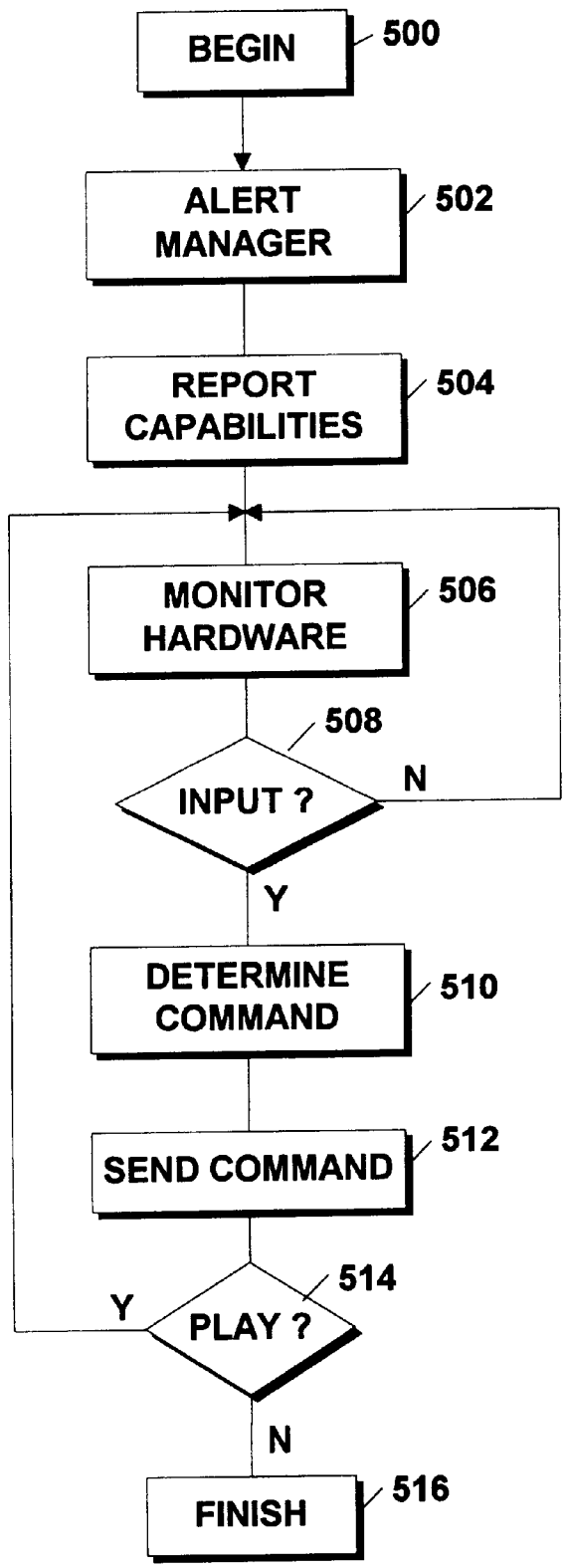
FIG. 5 is a flow chart illustrating the general operation of a DVD application program in accordance with the principles of the present invention.

The input manager 300 employs the registry 308, which is illustrated in greater detail in the block schematic diagram of FIG. 4, to accommodate various input devices that may have different capabilities. The registry 308 includes n product keys, Product Key 1 324 through Product Key n 326, with one product key allocated to each application 211. Each product key 326 includes a unique driver ID 328 which identifies the input device drivers, such as mouse driver 306, speech driver 304, or IR driver 302, and, in turn, the input device, associated with the product key. The product key also includes default settings 330, such as device driver rankings that have been stored in a nonvolatile storage medium, and presentation information 332 which details the manner in which user options are to be displayed. The application program 211 which, illustratively, includes the presentation engine 212 and navigation object 208, registers this information with the input manager and identifies the current user, if this information is available. As described in greater detail in the discussion related to FIG. 7, upon initialization, whether due to the application of power to the DVD player or to a reset command received in conjunction with a new user session, the input manager "walks through" the registry 308 and creates input driver objects, as indicated by the product keys.

The process begins in step 500 and proceeds to step 502 where a device driver alerts the input manager to the fact that the device driver has been installed within the DVD playback system. This event typically occurs when power is applied to the DVD playback system and is effected by the driver establishing a product key within the registry. Next, in step 504, the device driver reports its particular capabilities to the input manager by, illustratively, incorporating such information in its associated product key. Once the device driver has alerted and reported its capabilities to the input manager in this fashion, the process proceeds to 506.

In step 506, the device driver begins to monitor its associated hardware, e.g., speech input driver 305 monitors the speech physical interface 108, and proceeds to step 508 when the hardware indicates, through a mechanism such as an interrupt, for example, that the driver should interact with the hardware. Alternatively, the driver may monitor the hardware by continuously checking "an event flag". In any case, in step 508 the driver determines whether the hardware is signaling that a user input has been received. If no user input has been received, the process returns to step 506 where the driver resumes monitoring the hardware. On the other hand, should the device driver determine in step 508 that the driver has received user input from the hardware, the process proceeds to step 510 where the device driver determines what signal the hardware has received and passed along to the device driver. Illustratively, the signal received by the hardware and passed along to the driver may be in the form of button information and the device driver converts this button position information to commands which are, typically, supported by input manager 300.

After determining the proper command, corresponding to the position information, the device drivers operation proceeds to step 512 where the driver sends the corresponding command to the input manager 300. From step 512 the process proceeds to step 514 where the device driver determines whether the device driver should continue monitoring hardware. That is, the device driver determines at this point whether the operation of the DVD player is to continue. If the DVD player is to continue operation, the device driver returns to step 506 where it resumes monitoring its associated hardware. On the other hand, if the device driver determines in step 514 that a DVD player is ceasing operation e.g., if a user activates the power button, or if a title finishes playing and the input manager sends a message to that effect to the driver (the input manager calls the destructor in an object-oriented implementation), the process proceeds to finish in step 516.

Figure 6:
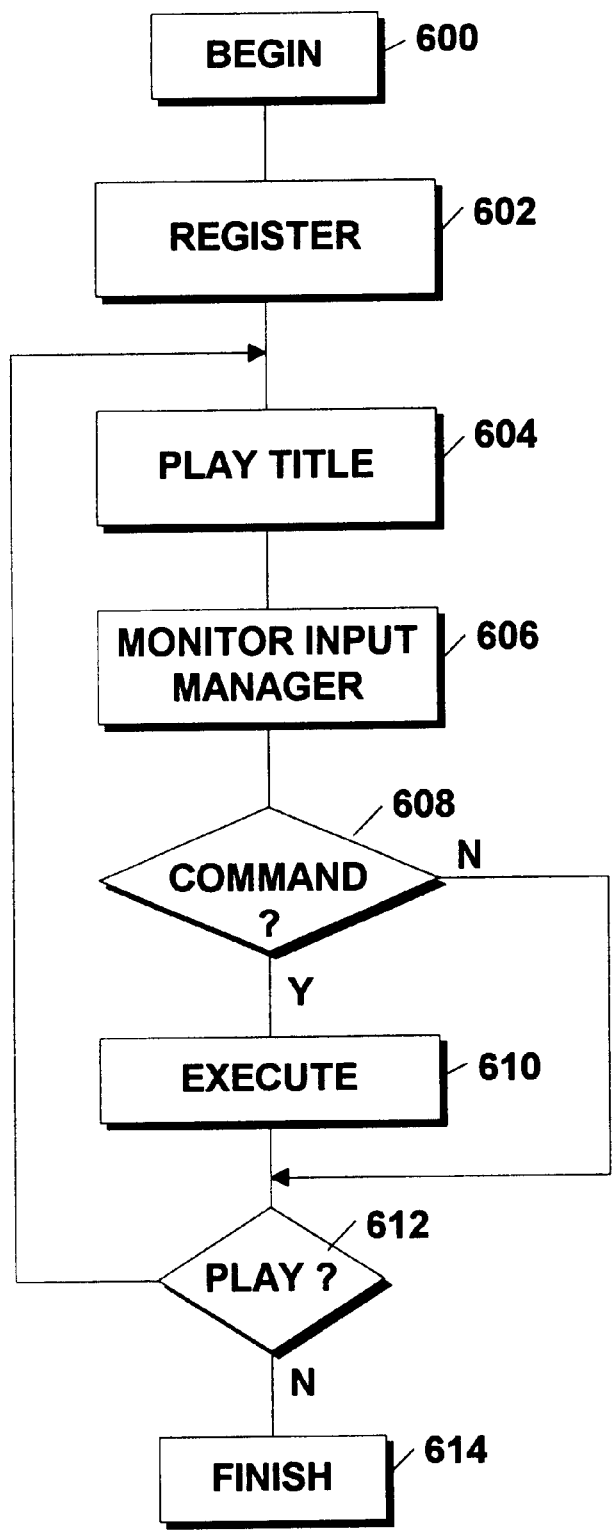
FIG. 6 is an illustrative flow chart illustrating the operation of a client application.

An illustrative example of the operation of the client application 211 is set forth in the flow chart in FIG. 6. The process begins at step 600 and proceeds to step 602, where the client application 211 registers with the input manager. The client application registration may be effected, for example, by sending a flag within one or more of the product keys, for example. After registering with the input manager 300 and receiving a play command from the input manager 300, the client application 211 proceeds to step 604 where it begins to play the requested DVD title. After starting to play the requested title, the process proceeds to step 606.

The client application then monitors the input manager event queue. This monitoring may be accomplished, for example by checking a flag in step 608 to determine whether the input manager has commands ready for the client application. If the client application 211 determines in step 608 that the input manager has an input command available, the process proceeds to step 610 where the client application retrieves and executes the input command. From step 610 the process proceeds to step 612, as it also does in step 608 if the client application determines that commands are not available from the input manager. In step 612, the client application determines whether the DVD player is to continue operation. If a DVD player is to continue operation, the process proceeds to 604 and from there as previously described. On the other hand, if the client application determines in step 612 that the DVD player is to cease operation, the process proceeds to finish in step 614.

Figure 7A:
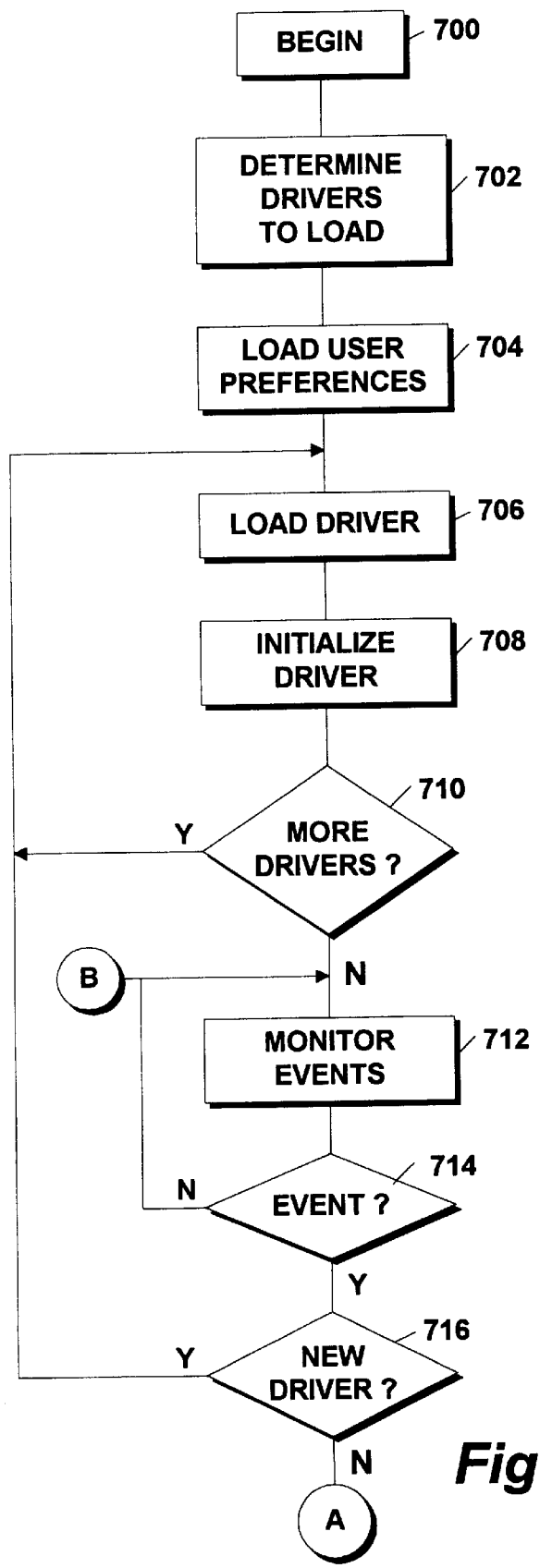
FIGS. 7A and 7B together form a flow chart which illustrates the operation of the DVD input manager.
Figure 7B:
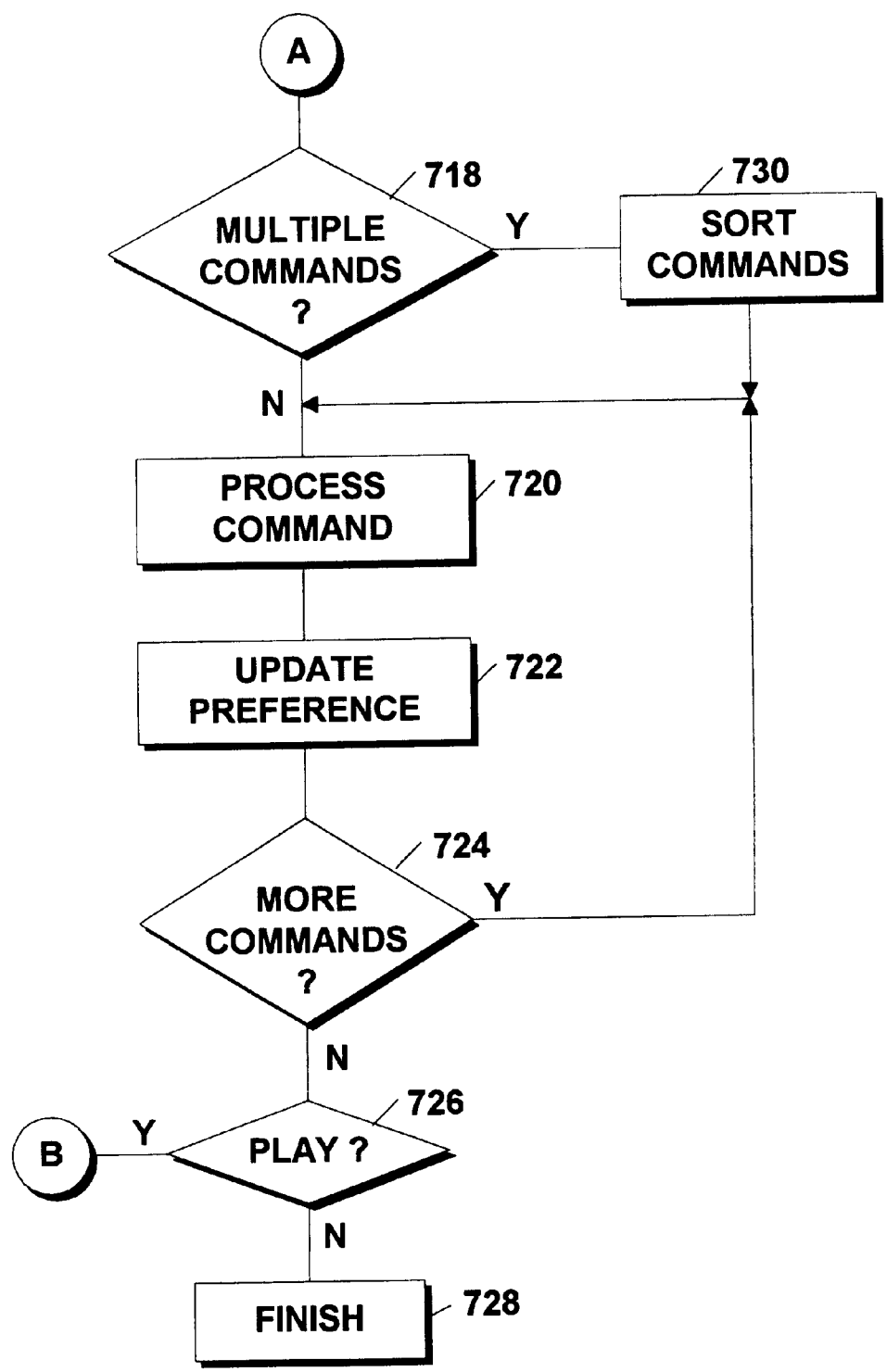

An illustrative embodiment of the input manager 300 operation is set forth in the flow chart in FIGS. 7A and 7B. Operation of the input manager 300 begins in step 700 and proceeds to step 702, where the input manager 300 examines the registry 308 to determine which device drivers to load. In the illustrative embodiment, the input manager loads all drivers that are registered. From step 702 the process proceeds to step 704, where a user's input device preferences are retrieved from nonvolatile storage. The preferences may be user specific, so that user A's preferences will be retrieved when user A is operating the DVD playback system. If preferences are yet to be established for a user, an input device preference indicator for the new user is established and initialized.

After loading the user's input device preferences in this manner, the process proceeds to step 706 where the input manager 300 loads the input device driver. This is accomplished by the input manager 300 locating a product key in the registry 308 and determining from the product key, which associates various client applications with input device drivers, which input device driver to load, given the client applications that have registered with the input manager. In an object-oriented technology implementation, the process of loading the driver involves the input manager creating an input device driver object. From step 706 the process proceeds to step 708 where the input manager initializes the driver. After initializing the driver, the process proceeds to step 710, where the input manager determines whether more device drivers are to be loaded given the applications that have been registered with the input manager. If more drivers are to be loaded, the process returns to step 706 and from there as previously described.

If there are no more drivers to load, the process proceeds from step 710 to step 712 where the input manager begins to monitor device driver events. In an illustrative embodiment, the input manager checks an event queue to determine whether there are any input device driver events in the queue. An event may be an indication by a new driver that it is being added to the DVD playback system, or it may be a command from a device driver. The input manager 300 examines the event queue in step 714 and returns to step 712 if no events are the event queue. If the input manager determines in step 714 that an input device driver event is not indicated in the event queue, the input manager proceeds from step 714 to step 716 where the input manager determines whether the event queue indicates a new driver is being installed in the DVD playback system. If the event is a new device driver installation, the process proceeds from 716 to step 706 and from there as previously described. The new driver may be installed, for example, as a result of the installation of a "plug and play" device which is added to the system after the system is initialized. This addition results in a hardware event, e.g., an interrupt, that is reflected in the registry 308 and which the input manager detects by monitoring the registry 308.

On the other hand, if the event is not the installation of a new device driver, the process proceeds from step 716 to step 718, where the input manager empties the event queue, which may be may be several events deep, for processing and determines whether there are multiple commands in the event queue. The event queue may contain a plurality of events if, for example, a user activates a button before a first input may be processed. If there are multiple commands in the event queue, the process proceeds to step 730 where the input manager sorts the commands, based upon the current user's input device preferences, with the input device most frequently employed by the user receiving the higher preferences. The sorting process may take the form of a sequential ranking or it may involve analysis of the commands themselves to, for example, eliminate a command from a lower ranking input device which conflicts with a command from a higher ranking device.

After sorting commands in step 730, the process proceeds to step 702, as it would proceed from step 718 should it be determined in step 718 that there is only one input command in the event queue. In step 720, the input manager processes an input command, passing it through to a client application, with or without interpretation, as needed. From step 720, the process proceeds to step 722, where the input manager 300 updates the current user's input preference indicator, which may take the form of a counter that is incremented with each input device's use, for example.

From step 722, the process proceeds to step 724 where the input manager determines whether there are more input commands to be processed and, if there are, the process returns to step 720 and from there as previously described. On the other hand, if the input manager 300 determines in step 724 that there are no more commands to process, the process proceeds to step 726 where the input manager 300 determines whether the current title is to continue playing. If the current title is to continue playing, the process returns through off-page connector B to step 712 where the input manager 300 resumes monitoring of events. On the other hand, if the current title is not to continue playing, the process proceeds from step 726 to finish in step 728.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. For example, the inventive concepts may be applied to any player which processes a data stream, including, but not limited to, a digital media player such as a direct broadcast satellite player. It will be obvious to those reasonably skilled in the art that other components performing the same functions may be substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. Apparatus for use with an application program, the apparatus comprising:

an input device driver responsive to input signals from an input device for producing commands from the input signals;

an input manager having an input manager registry, the input manager being responsive to commands from the input device driver for producing commands for use by the application program, the input manager being configured to rank the relative preference of an input device for a given user.

2. Apparatus of claim 1 further comprising a plurality of input device drivers, the input manager being configured for translating commands from selected of the plurality of input device drivers into commands supported by the application program.

3. Apparatus of claim 1 wherein the input manager is configured to determine which commands are translated and passed to the application program, when commands are received substantially simultaneously from different input devices.

4. Apparatus of claim 1 wherein the input manager is configured for ranking input devices for more than one user.

5. Apparatus of claim 4 wherein the input manager is configured for storing input device rankings for each user in a memory and for initializing the rankings by retrieving the stored rankings and employing the stored ranking values as the initial ranking values.

6. Apparatus of claim 5, wherein the input manager is configured for examining a command from an input driver, determining whether the command is supported by the application program, and passing the command to the application if the command is supported by the application.

7. Apparatus of claim 6 wherein the input manager is configured to suppress commands not supported by the application program.

8. Apparatus of claim 6 wherein the input manager is configured for translating commands not supported by the application into commands that are supported by the application program.

9. A method for providing a user input command generated by an input device to an application program, the method comprising the steps of:

converting an input-device signal into a digital signal recognizable by an input-device specific driver;

converting the digital signal recognizable by an input-device specific driver into a signal that is recognizable by an input manager; and ranking user preferences for input-device specific drivers.

10. The method of claim 9 further comprising the step of:

correlating a user's frequency of use with the user's preference ranking for a particular input device.

11. The method of claim 10 further comprising the step of:

storing user preference rankings in a user identification file.

12. The method of claim 11 further comprising the step of:

translating a digital signal recognizable by an input manager into a digital signal recognizable by the application program, and passing the translated signal to the application program.

13. The method of claim 12 wherein the step of passing translated signals to the application program comprises the step of:

passing the translated signals to the application program in a sequence determined by the ranking of user preferences, when inputs are received from two input devices substantially simultaneously.

14. The method of claim 12 wherein the step of passing a signal to the application program comprises the step of:

passing the translated signal from a frequently used input device to the application program before passing the translated signal from a less frequently-used device, when input events are represented by an event flag in an event queue.

15. A computer program product for responding to user commands in a media player system having an application program and a user input device for receiving user commands, the computer program product comprising a computer usable medium having computer readable program code thereon comprising:

program code for creating an input device driver and converting a user's input-device specific input into a digital signal recognizable by the input-device specific driver, program code for creating an input manager and converting the digital signal recognizable by the input-device specific driver into a signal that both corresponds to the input from the user and is recognizable by the input manager, program code for converting the digital signal recognizable by the input manager to a digital signal recognizable by an application program, program code for passing the digital signal from the input manager to the application program; and program code for ranking user preferences for each of the input device specific drivers.

16. The computer program product of claim 15 further comprising:

program code for correlating a user's frequency of use with the user's preference ranking for a particular input device.

17. The computer program product of claim 16 wherein the code for passing a command from the input manager to the application program when commands are received from two input devices substantially simultaneously comprises:

program code for passing input commands from the input devices to an application program in a sequence determined by the user preference rankings and program code for storing user preference rankings and retrieving those rankings to be employed as initial ranking values.

* * * * *